United States Patent

[11] 3,622,489

| [72] | Inventors | Valeriu Dumitrescu<br>Bucharest;<br>Dan Ciulin, Bucharest; Paun Constantin,<br>Plotesti, all of Romania |
|---|---|---|
| [21] | Appl. No. | 763,055 |
| [22] | Filed | Sept. 25, 1968 |
| [45] | Patented | Nov. 23, 1971 |
| [73] | Assignee | Institutual De Cercetari Si Projectari<br>Pentru Industria Extractiva De Titei Si<br>Gaze<br>Continuation-in-part of application Ser. No.<br>401,476, Oct. 5, 1964, now abandoned.<br>This application Sept. 25, 1968, Ser. No.<br>763,055 |

[54] CATHODIC PROTECTION SYSTEM
5 Claims, 6 Drawing Figs.

[52] U.S. Cl. .................................................. 204/196, 204/197
[51] Int. Cl. .................................................. C23f 13/00
[50] Field of Search .......................................... 204/147, 148, 196, 197; 307/95

[56] References Cited
UNITED STATES PATENTS
3,242,064  3/1966  Byrne ........................... 204/196
FOREIGN PATENTS
1,046,819  10/1966  Great Britain ................ 204/196

Primary Examiner—T. Tung
Attorney—Arthur O. Klein

ABSTRACT: An impressed-current cathodic protection system for use with a relatively high impedance electrolyte such as moist earth employs Zener diodes operated below their breakdown voltage to establish a high input impedance for the circuitry that controls the current output to the system anode. The latter output is obtained by integrating and recuperating a sequence of high frequency, high duty factor pulses that are modulated in duration in accordance with the deviation of the output of a reference half-cell, which senses the potential on the object to be protected, from a desired potential indicative of the desired protection level.

3,622,489

CATHODIC PROTECTION SYSTEM

RELATED APPLICATIONS

This case is a continuation-in-part of applications' copending application Ser. No. 401,476, filed Oct. 5, 1964, and entitled "PROCEDURE AND AUTOMATIC INSTALLATION FOR CATHODIC PROTECTION OF BURIED METALLIC PIPELINES" now abandoned.

BACKGROUND OF THE INVENTION

Impressed-current cathodic protection systems wherein a metallic object embedded in an electrolyte is protected against galvanic corrosion are well known in the art. The object to be protected is made the cathode of the apparatus, and a reference half-cell which may be cathodic with respect to the object senses the instantaneous potential of the object. The half-cell potential is coupled to the input of a control system which generates a first DC control signal proportional to the instantaneous deviation of the half-cell potential from a predetermined potential indicative of a desired level of protection of the object. The output of the control system is a unidirectional current whose amplitude is proportional to the first DC control signal. This current is impressed on the anode of the system, and the resultant anode-cathode current flow through the electrolyte adjusts the cathode potential to the desired value.

In general, existing systems of this type are arranged to protect ships hulls and the like which are immersed in a relatively low impedance electrolyte such as sea water. Such systems, typified by U.S. Pat. No. 3,242,064 issued to P. B. Byrne on Mar. 22, 1966, employ control circuitry having a relatively low input impedance corresponding to the low effective terminal impedance presented by the reference half-cell when operating in a sea water electrolyte. The output of such systems is pulsed DC, rather than highly filtered DC of lower level.

Unfortunately, control systems of the Byrne-type exhibit significant measurement errors when operating with relatively high impedance electrolytes, as in the protection of underground pipelines embedded in moist earth. These errors have been found to be caused, in large part, by two factors: (1) the high effective terminal impedance of the sensing half-cell when operating in moist earth, and (2) the tendency of the control system to become unstable when pulsed-DC current is impressed on the anode because of effective capacitances in the relatively high impedance coupling paths between the various electrodes of the buried pipeline system.

SUMMARY OF THE INVENTION

These drawbacks are overcome with a cathodic protection system in accordance with the invention, which is expressly designed for use with a relatively high impedance electrolyte such as moist earth. The first DC control signal is applied to at least one Zener diode operated below its breakdown voltage at the input of the control system for establishing a high impedance thereat. Variations in the diode capacitance caused by corresponding variations in the DC control signal are employed to modulate the duration of a sequence of high frequency, high duty factor current pulses of constant repetition rate, which pulses are integrated and recuperated to form a highly filtered DC output that is impressed on the anode.

In an illustrative embodiment, the DC control signal is applied across one diagonal for a bridge having a pair of Zener diodes operated below their breakdown voltage in adjacent balance arms thereof. A continuous sequence of repetitive pulses is applied across the other diagonal of the bridge to provide a pulsed bridge output whose amplitude follows the variations in the first DC control signal. The amplitude of the bridge output is compared in a threshold circuit with that of a high-frequency sweep signal so that only those portions of the sweep that are greater than the bridge output are integrated and recuperated and coupled to the anode.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
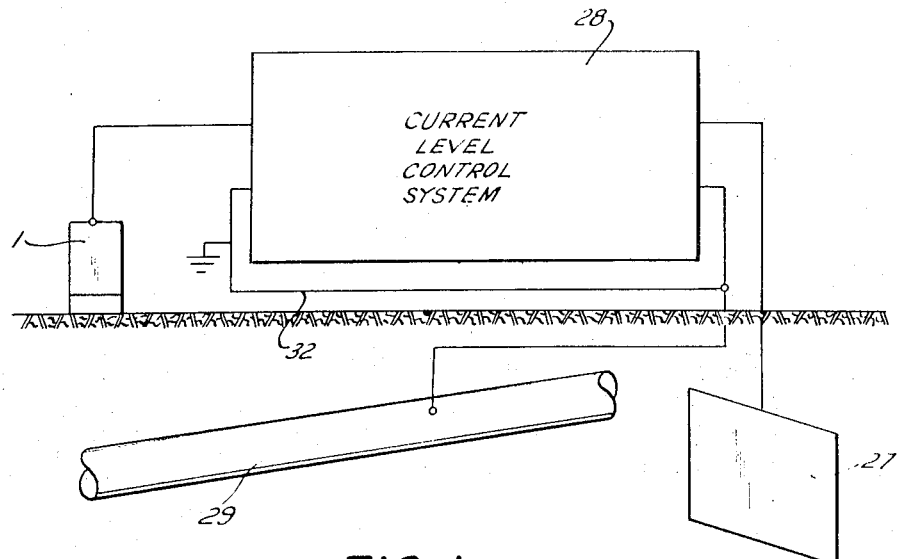
FIG. 1 is a pictorial representation of an impressed-current cathodic protection system for a pipe buried in moist earth.

Referring now in more detail to the drawing, FIG. 1 shows an impressed-current cathodic protection system for preventing electrolytic corrosion of a metallic object, illustratively an aluminum pipe 29, that is embedded in a relatively high resistance electrolyte 31 such as moist earth.

It will be understood that pipes made from steel and other conventional material are equally comprehended by the invention.

An instantaneous indication of the level of cathodic protection on the pipe 29 is provided by a conventional sensing half-cell 1 that is in contact with the earth in close proximity to the pipe. The half-cell, which ideally has a relatively constant potential when immersed in an electrolyte, may be cathodic with respect to the aluminum pipe 29. It will be understood that, if necessary, undesired polarization of the half-cell 1 due to election flow between the cell and the pipe through the moist earth may be prevented in the manner described, e.g., in U.S. Pat. No. 2,982,714 issued to R. C. Sabins on May 2, 1961.

A current level control system 28 (whose function is generally analogous to that described in the above-mentioned Byrne patent in connection with the protection of a ship's hull) is coupled to the cell 1. The control system 28 is employed to (1) derive a first DC control signal proportional to the instantaneous deviation of the potential on the half-cell 1 from a predetermined potential indicative at a desired level of protection of the pipe 29 and (2) providing, at its output, a unidirectional current proportional to the level of the first DC control signal. The unidirectional current is impressed on an anode 27 located adjacent the pipe 29. The anode may be of platinum or other electrochemically insert material or, if desired, of magnesium or other active material that is anodic with respect to the pipe material, so that if the impressed current system should fail the anode can still provide electrochemical protection by sacrificial means. It will be further understood that where steel is used as the pipe material, zinc or carbon would be a suitable anode material. The impressed current is coupled from the anode through the moist earth to the pipe 29 to maintain the latter at the predetermined potential required to prevent corrosion. For reference purposes, the pipe 29 is illustrated as being connected to a common terminal 32 depicted for convenience as ground) of the control system 28. It will be understood that the common terminal, which may represent the mass terminal of the apparatus, does not represent the moist earth electrolyte. The required coupling between the anode 27, the half-cell 1 and the pipe 29 is completed via the electrolyte 31 to establish a closed circuit through the control system 28.

In accordance with the invention, the input of the level control system 28 includes one or more reverse-biased Zener diodes which are operated below their breakdown point at all times to present a high impedance (e.g., 50 megohms) to the half-cell 1. This high impedance has been found to be required to prevent measuring errors due to the half-cell's high effective terminal impedance (e.g., 10—250 kilohms) in moist earth, as compared to its effective impedance (e.g., several tens of ohms) in sea water or other low-resistance electrolyte.

In further accordance with the invention, it has been found that the prevention of additional measuring errors in the moist earth electrolyte system contemplated by this invention requires a unidirectional current output to the anode 27 whose DC component is much more predominant and highly filtered than that of the pulsed-DC impressed current systems used in the prior art to protect ships' hulls in sea water. To obtain the required DC component, the instant scheme provides means in the level control system 28 for (1) generating high duty factor, high-frequency output current pulses having a repetition period and a duration dependent on the level of the first DC control signal, thereby providing a relatively large average DC component, and (2) integrating and recuperating the pulses to further increase the average component thereof prior to application to the anode 27.

Figure 2:
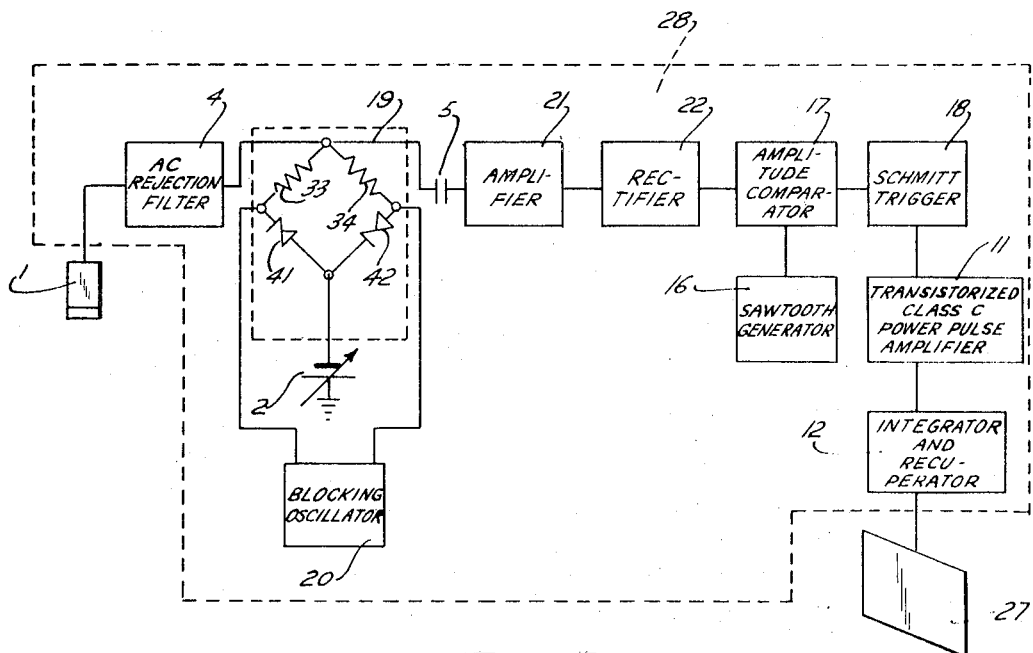
FIG. 2 is a block and schematic diagram of a first embodiment of control circuit constructed in accordance with the invention for use in the system of FIG. 1.
Figure 3:
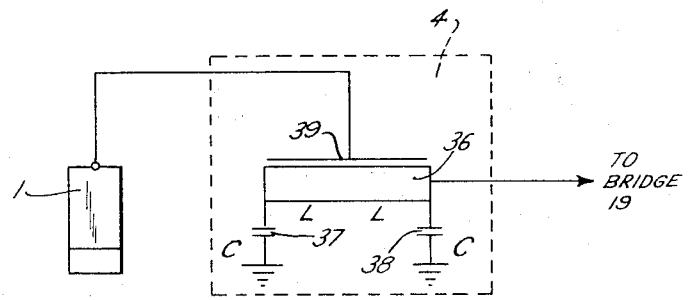
FIG. 3 is a schematic diagram of an AC-rejecting filter suitable for use with the arrangement of FIG. 2.

One embodiment of a level control system having those features is shown in FIG. 2, in which the pipe to be protected (which is assumed to be connected to the common terminal 32 of the depicted circuit as explained above) is omitted for purposes of simplicity. The output of the sensing half-cell 1 is applied, through an AC-rejecting filter 4, to the junction of a pair of resistors 33 and 34 that form an adjacent pair of arms of a bridge 19. As shown in FIG. 3, the filter 4 may take the form of a balanced L–C circuit including a center-tapped coil 36 and a pair of capacitors 37 and 38 respectively coupled from opposite ends of the coil 36 to ground. The output of the half-cell 1 is connected to the center tap (designated 39) of the coil 36, while the filter output is taken across the capacitor 38. With this arrangement, undesired AC components picked up by the half-cell are substantially cancelled to help insure proper stability of the level control system 28.

Referring again to FIG. 2, an adjustable grounded DC source 2 which is adjusted to protest against corresponding corrosion potential on the pipe to be protected is coupled to the junction of a pair of Zener diodes 41 and 42 forming the other two arms of the bridge 19. The polarity of the source 2 is selected to oppose the polarity of the half-cell 1, which is effectively connected in series therewith across a first diagonal of the bridge as viewed in FIG. 2 to form the first DC control signal. The DC control signal is presumed to be negligible with respect to the breakdown voltage of the Zener diodes so that the latter always present the required high impedance to the half-cell 1.

While the adjustable source 2 has been represented by a battery, it may also take the form of a potentiometer output of the type described in the above-mentioned Byrne patent. As explained in that patent, for example, the optimum potential of the source 2 is a known function of the material of the half-cell and the pipe to be protected. For the assumed case of a steel cell and an aluminum pipe, the potential of the source 2 should be about 400 millivolts. It will be appreciated that where a steel pipe is employed a corresponding potential of the source 2 should be used.

Figure 4:
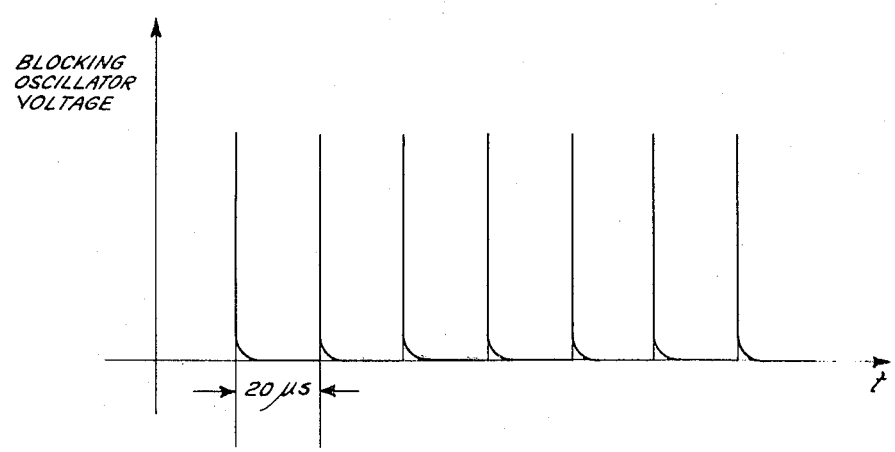
FIG. 4 is a waveform diagram of the output of a blocking oscillator suitable for use with the arrangement of FIG. 2.

The output of a conventional blocking oscillator 20 (FIG. 2) operating at an illustrative repetition rate of 50 kc. as depicted in FIG. 4 is applied to a second diagonal of the bridge, i.e., between the junction of the resistor 33 (FIG. 2) and the diode 41 and the junction of the resistor 34 and the diode 42. With this arrangement, the output of the bridge 19, which is taken between the junction of the resistors 33 and 34 and ground, is a succession of pulses similar to FIG. 4 but having an amplitude that varies in proportion to the degree of unbalance of the bridge 19. The latter, in turn, varies in proportion to the changes in capacitance of the diodes 41 and 42 caused by corresponding changes in the amplitude of the first DC control signal. The pulse output of the bridge 19 is coupled through a capacitor 5 to an amplifier 21. The amplified output is rectified in a rectifier 22 to form a second DC control signal which is representative of the amplitude of the output pulses from the bridge 19 and which therefore follows the variations in the first DC control signal applied to the bridge 19.

The amplitude of the second DC control signal is compared, in a comparator 17, with the sweep output of an RF sawtooth generator 16 having a high duty factor (i.e., having a sweep duration which is assumed to be a substantial fraction of its repetition period). The comparator 17 may be a conventional threshold device which provides an output that corresponds to the portion of each sweep of the generator 16 up to the time when the sweep amplitude equals the instantaneous value of the second DC control signal, and which provides essentially zero output for the remainder of each sawtooth cycle. Thus, the output of the comparator 17 is a repetitive, high duty factor sawtooth signal whose sweep duration is effectively modulated in accordance with the deviation of the output of the half-cell 1 from the predetermined voltage of the source 2.

The modulated sweep output from the comparator 17 is converted, in a conventional Schmitt trigger circuit 18, into a sequence of high duty factor rectangular pulses whose duration is equal to the instantaneous sweep duration at the output of the comparator 17 and whose period is equal to that of the sawtooth generator 16.

The high-frequency, modulated pulse output of the Schmitt trigger 18 is then amplified in a transistorized class C power pulse amplifier 11 and integrated and recuperated in a suitable integrator and recuperator 12 to provide the DC current output for the anode 27.

Figure 5:
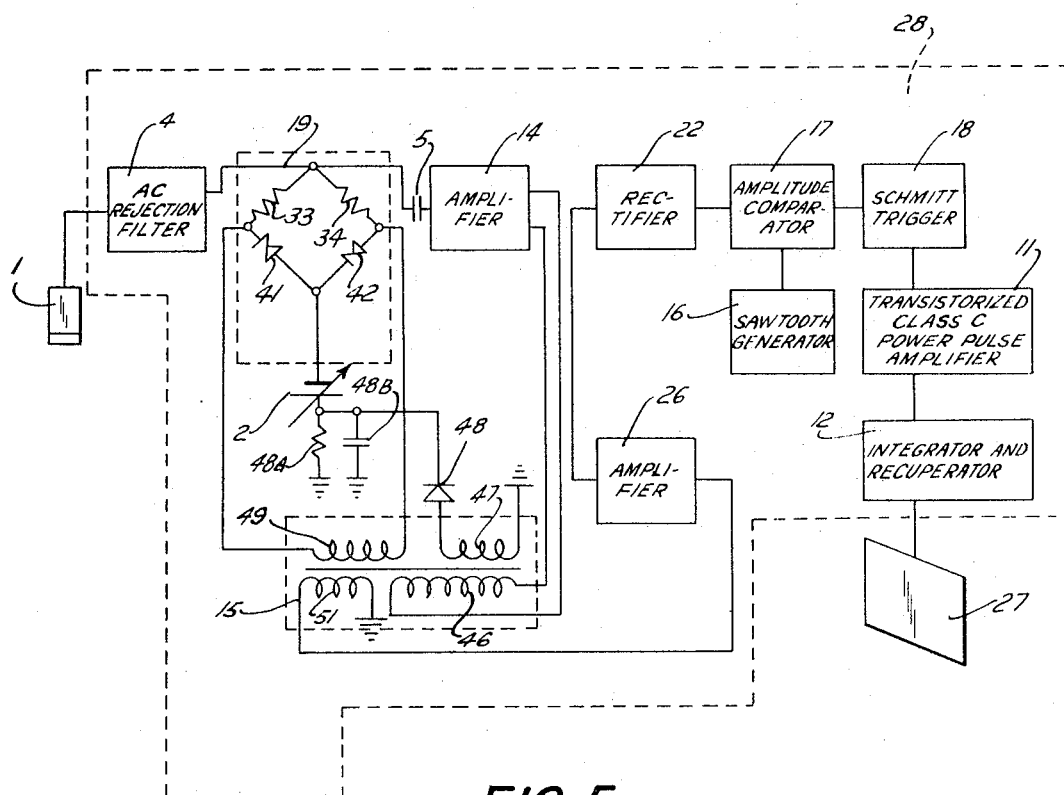

FIG. 5 shows an alternative embodiment of the level control system 28. Corresponding elements in FIGS. 2 and 5 (and in FIG. 6 described below) have been given corresponding reference numerals. In FIG. 5, the blocking oscillator has been eliminated, and the pulse input to the second diagonal of the bridge is provided by feeding back, to the bridge input, the output of an amplifier 14 coupled to the bridge 19 through the capacitor 5. For this purpose, the output of the amplifier 14 is applied across a primary winding 46 of a multiwinding transformer 15. The output of a first secondary winding 47 is rectified in diode 48, and the resultant DC feedback voltage is serially connected, in opposing relation, with the predetermined voltage of the source 2. For this purpose, the feedback voltage is developed across a resistor 48A that is sprinted by a capacitor 48B. The output of a second secondary winding 49 of the transformer 15 is coupled across the second diagonal of the bridge. The output of a third secondary winding 51 is coupled through an amplifier 26 to provide, to the input of the rectifier 22, a sequence of pulses whose amplitude is proportional to the first DC control signal. The remainder of the arrangement and generation of FIG. 5 is identical to that of the scheme of FIG. 2.

Figure 6:
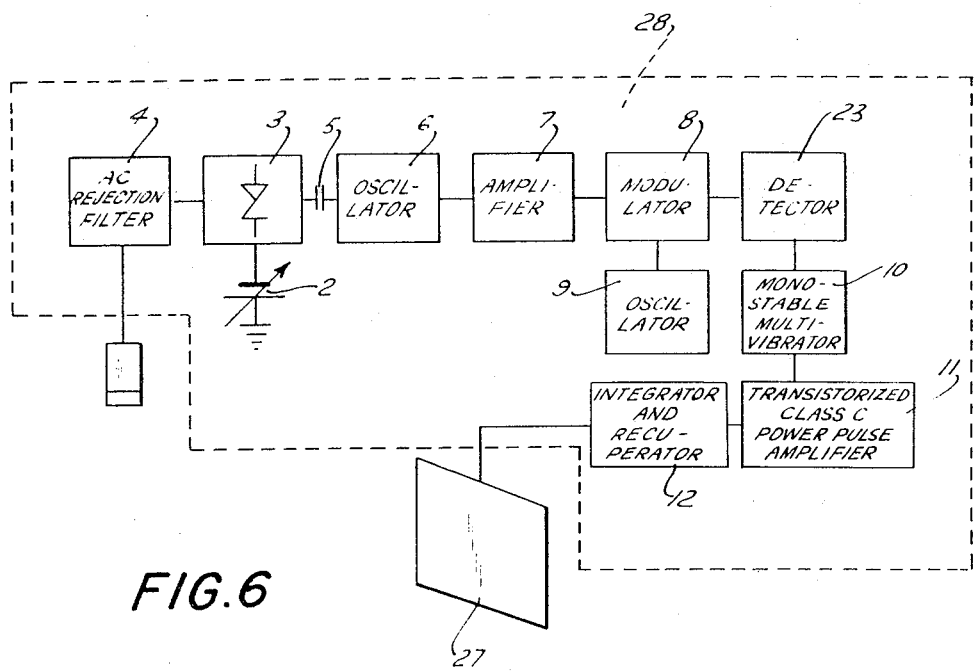
FIGS. 5 and 6 are block and schematic diagrams of second and third embodiments, respectively, of a control circuit constructed in accordance with the invention for use in the system of FIG. 1.

FIG. 6 illustrates, in simplified form, a third embodiment of the level control system 28 of the invention. The filtered DC output of the half-cell 1 and the DC output of the source 2 are applied across a single Zener diode 3; since the difference between the applied voltages (i.e., the first DC control signal) is small the diode is operated below its breakdown voltage, i.e., in its high impedance state. As in FIGS. 2 and 5, variations in the first DC control signal cause corresponding variations in the output of the diode 3 (FIG. 6). These capacitance variations, in turn, drive an RF oscillator 6 coupled to the output of the diode 3 into and but of oscillation.

The output of the RF oscillator 6, after amplification in an amplifier 7, is modulated by the output of an oscillator 9 (operating, e.g., at 2 kc. in a modulator 8. The modulated output is detected by a detector 23 to yield a 2 kc. control signal. The latter is applied to the triggering input of a monostable multivibrator 10, whose internal time constants are chosen to yield a pulse duration several times larger than the repetition period of the incoming 2 kc. pulses.

Following the termination of each multivibrator pulse, the multivibrator 10 may again be triggered at a selectable time during the next succeeding period of the 2 kc. input, so that the duration of its relatively long output pulse may be accordingly varied. With this arrangement, the multivibrator 10 yields high frequency, high duty factor current pulses having a repetition rate several times lower than the trigger input. The multivibrator output is amplified in the amplifier 11, integrated and recuperated in the integrator and recuperator 12, and impressed on the anode 27 in the manner described above.

It will be appreciated that the components shown in block form in FIGS. 2, 5 and 6, whose detailed structure form no part of the present invention, are individually well known in the art and may be constructed in any suitable manner.

In the foregoing, the invention has been described in connection with illustrative arrangements thereof. Many variations and modifications will now occur to those skilled in the art. It is accordingly desired that the scope of the appended claims not be limited to the specific disclosure herein contained.

We claim:

1. For use with a relatively high impedance electrolyte, an impressed-current cathodic protection apparatus for a metallic cathode immersed in the electrolyte in operative relation with a metallic anode wherein a first DC control signal having an amplitude within a prescribed operating range and proportional to the deviation of the actual cathode potential from a predetermined potential indicative of a desired protection level of the cathode is coupled to the input terminals of the apparatus to control the magnitude of a unidirectional flow of current from the output terminals of the apparatus to the anode for application to the cathode, which comprises:

at least one Zener diode operative in its high impedance region when subjected to an operating potential within the prescribed range;

means for coupling the diode to the input terminals of the apparatus to establish a high input impedance thereof in the presence of the first DC control signal, the diode capacitance varying in accordance with variations in the first DC control signal;

means for generating a continuous sequence of high frequency, high duty factor first pulses having a constant repetition period;

means coupling the diode output to the generating means for varying the duration of the first pulses in accordance with the capacitance variations of the diode;

means for integrating and recuperating the duration-modulated first pulses to establish a unidirectional flow of current of essentially constant magnitude; and means for coupling the output of the integrating and recuperating means to the anode.

2. For use with a relatively high impedance electrolyte, an impressed-current cathodic protection apparatus for a metallic cathode immersed in the electrolyte in operative relation with a metallic anode wherein a first DC control signal having an amplitude within a prescribed operating range and proportional to the deviation of the actual cathode potential from a predetermined potential indicative of a desired protection level of the cathode is coupled to the input terminals of the apparatus to control the magnitude of a unidirectional flow of current from the output terminals of the apparatus to the anode for application to the cathode, which comprises:

a bridge circuit including a pair of serially connected Zener diodes which respectively form adjacent first arms of the bridge, said diodes being operative in their high impedance regions when subjected to an operating potential within the prescribed range;

means for coupling to the input terminals of the apparatus, a first diagonal of the bridge which includes the junction of the first arms to establish a high input impedance of the apparatus in the presence of the first DC control signal, the degree of unbalance of the bridge being proportional to the magnitude of the first DC control signal;

means for generating a first continuous sequence of repetitive pulses;

means for applying the first pulse sequence across a second bridge diagonal so that the bridge output is a second sequence of pulses whose amplitude is proportional to the degree of unbalance of the bridge;

means for generating a third sequence of high frequency, high duty factor sweep of at a fixed repetition rate;

threshold means for comparing the amplitude of the second sequence of pulses with that of the third sequence of signals and for transmitting those portions of the third sequence whose amplitude is greater than the amplitude of the second sequence of pulses;

means for integrating and recuperating the transmitted portions of the third sequence to produce a unidirectional flow of current of essentially constant magnitude; and means for coupling the output of the integrating and recuperating means to the anode.

3. Apparatus as defined in claim 2, further comprising, in combination, means for converting the transmitted portions of the third sequence into substantially rectangular pulses having the duration and period of the transmitted portions, and means for coupling the output of the converting means to the input of the integrating and recuperating means.

4. Apparatus as defined in claim 2, in which the means for generating the first pulse sequence comprises, in combination, an amplifier coupled to the output of the bridge, a transformer having a primary winding and first, second and third windings, means for coupling the output of the amplifier to the primary winding, means for rectifying the output of the first secondary winding, and means for connecting the last-mentioned rectified output in series with the first DC control signal; the means for coupling the first pulse sequence across the second bridge diagonal comprises the second secondary winding; and the apparatus further comprises means for coupling the third secondary winding to the input of the threshold means.

5. Apparatus as defined in claim 2, in which the means for generating the first pulse sequence comprises a blocking oscillator.

* * * * *